US 6,554,162 B2

(12) United States Patent
Schell et al.

(10) Patent No.: US 6,554,162 B2
(45) Date of Patent: Apr. 29, 2003

(54) SYSTEM AND METHOD FOR ACCURATELY BLENDING FLUIDS

(75) Inventors: Daniel Schell, Los Gatos, CA (US); Dan C. Prince, Milpitas, CA (US)

(73) Assignee: Chemand Corporation, San Jose, CA (US)

( * ) Notice: Subject to any disclaimer, the term of this patent is extended or adjusted under 35 U.S.C. 154(b) by 0 days.

(21) Appl. No.: 09/865,359

(22) Filed: May 24, 2001

(65) Prior Publication Data

US 2002/0175183 A1 Nov. 28, 2002

(51) Int. Cl.⁷ .................................................. B67D 3/00
(52) U.S. Cl. ........................... 222/64; 222/1; 222/61; 222/14; 222/21; 222/26
(58) Field of Search .............................. 222/1, 14, 17, 222/21, 61, 64–68, 26, 424.5, 425, 426, 428, 430, 434, 438–440, 442–444, 450; 141/67, 198, 324

(56) References Cited

U.S. PATENT DOCUMENTS

| | | | | |
|---|---|---|---|---|
| 1,307,827 A | * | 6/1919 | Miller ........................... 222/26 |
| 1,711,331 A | * | 4/1929 | Smith ........................... 222/430 |
| 1,819,330 A | * | 8/1931 | Jackson et al. ................. 222/14 |
| 1,874,302 A | | 8/1932 | Van Clinton Jones |
| 3,270,784 A | | 9/1966 | Mistarz .......................... 141/2 |
| 4,580,699 A | * | 4/1986 | Black et al. .................. 222/64 |
| 4,630,753 A | | 12/1986 | Anscherlik .................... 222/17 |
| 4,978,029 A | * | 12/1990 | Furrow et al. ................. 222/26 |
| 5,224,526 A | | 7/1993 | Mette et al. ................. 141/285 |
| 5,346,302 A | | 9/1994 | Ryu ............................ 366/101 |
| 5,370,269 A | | 12/1994 | Bernosky et al. .............. 222/61 |
| 5,375,739 A | * | 12/1994 | Granfelt ....................... 222/64 |
| 5,417,346 A | | 5/1995 | Ferri, Jr. et al. .............. 222/61 |
| 5,490,611 A | | 2/1996 | Bernosky et al. ............... 222/1 |
| 5,522,660 A | | 6/1996 | O'Dougherty et al. ........ 366/136 |
| 6,245,148 B1 | * | 6/2001 | Liangf et al. ................... 222/64 |

FOREIGN PATENT DOCUMENTS

| | | | |
|---|---|---|---|
| DE | 1257448 B | 12/1967 | |
| EP | 0479113 | 4/1992 | |
| EP | 1099471 A1 | 5/2001 | ........... B01F/15/04 |
| FR | 2329982 | 5/1977 | |
| JP | 55-075735 | 6/1980 | ........... B01F/15/04 |

* cited by examiner

Primary Examiner—J. Casimer Jacyna
(74) Attorney, Agent, or Firm—Henneman & Saunders; Larry E. Henneman, Jr.

(57) ABSTRACT

A fluid delivery system includes one or more measure modules for measuring and delivering predetermined volumes of one or more different fluids. Each measure module includes a fluid inlet port, a retention vessel, an overflow aperture to allow fluid in excess of the desired volume to flow out of the vessel, and an outlet port for dispensing the retained fluid. A calibrating rod adjustably occupies a portion of the volume of the vessel to facilitate precise adjustment of the volume of fluid dispensed by the measure module. In one particular embodiment, a blender includes a plurality of measure modules whose outputs are coupled together to produce a mixture having a composition defined by the relative capacities of the vessels of the various measure modules. In another particular embodiment, one blender dilutes a chemical concentrate, and provides the diluted mixture to another blender, which further dilutes the mixture.

42 Claims, 9 Drawing Sheets

SYSTEM AND METHOD FOR ACCURATELY BLENDING FLUIDS

BACKGROUND OF THE INVENTION

Field of the Invention

This invention relates generally to fluid dispensing systems, and more particularly to a system and method for dispensing a predetermined volume of fluid. Even more particularly, this invention relates to a system and method for accurately blending two or more fluids.

Onsite chemical mixing and delivery is difficult in industries requiring precise dilution and mixing ratios. Deterred by the difficulties involved in producing their own chemistry, such as labor expenses and precise molarity tolerances, industries such as semi-conductor fabrication typically purchase pre-diluted and/or pre-mixed chemicals. These pre-mixed chemicals, supplied by outside companies, vary slightly in price depending on concentration. The price per barrel of a chemical concentrate is typically only slightly higher than that of a dilution of the same chemical. Further, the freight cost of delivering multiple drums of chemicals is substantial.

Some industries opt to produce their own chemistry, but at the cost of large mixing vessels that are not typically automated. These large mixing vessels are useful only to entities able to afford the system's maintenance costs as well as supply the space needed to house such a system.

Notwithstanding these limitations, onsite mixing and delivery systems provide many advantages over purchasing pre-mixed chemicals. By utilizing a chemical delivery and mixing system, a single barrel of concentrate chemical produces many times its volume in diluted solution, depending on the desired concentration of the dilute. Thus, a single barrel of concentrate, used to produce many barrels of dilute via a chemical delivery and mixing system, greatly reduces freight costs associated with chemical delivery. In addition, onsite dilution and mixing increases the variety of chemical concentrations and mixtures that are immediately available, without requiring a corresponding increase in the number of chemicals that must be purchased from chemical manufacturers, thereby providing the logistical and administrative advantage of reduced inventory.

What is needed is a compact system capable of mixing, blending, and delivering precise volumes of chemicals onsite, allowing small industry to manufacture chemistry in desired molarities or weight ratios at minimal cost, and in reduced batch sizes.

SUMMARY

The present invention provides an advantage over the prior art by providing a compact fluid delivery system capable of producing large or small quantities of precisely mixed chemicals on demand. The embodiments of the invention shown herein are automated, but the present invention can be implemented in a manual or semi-manual system while retaining many of the advantages of the invention.

Fluid delivery systems according to the present invention include one or more measure modules for measuring and delivering precise volumes of fluids. Each measure module includes a fluid inlet port, a vessel, an overflow aperture, and a fluid outlet port. The vessel receives fluid via the fluid inlet port. The overflow aperture is positioned to define a predetermined retention capacity of the vessel, allowing excess fluid to flow out of the vessel while retaining the predetermined volume in the vessel. The measure module measures fluid by filling the vessel beyond its retention capacity, and then allowing the excess fluid to flow out through the overflow aperture.

An optional calibrating device (e.g., calibrating rod, slugs, inflatable bladder, etc.) facilitates fine adjustment of the retention capacity of the vessel. Alternatively, the position of the overflow aperture is adjustable. For example, in one embodiment the aperture is disposed atop a vertical drain tube, such that the height of the drain tube defines the retention capacity of the vessel.

An optional overflow reservoir collects the excess fluid flowing out of the vessel. The overflow fluid is transferred back into the vessel at the beginning of the next fill cycle. Use of the overflow reservoir prevents waste of expensive chemicals, and reduces the cost associated with disposal of hazardous chemicals.

One particular embodiment of the invention is capable of operation in two modes. In the first mode, the measure module operates as described above. In a second mode, however, the vertical drain tube functions as the "vessel" by measuring the amount of fluid to be dispensed. Excess fluid flowing out of the drain tube is collected by the vessel, which functions in the second mode as the "overflow reservoir."

Various fluid delivery systems are constructed by interconnecting a plurality of the above-described measure modules in different ways. For example, in one embodiment a plurality of chemicals are blended by coupling the outputs of a like plurality of measure modules. Each of the measure modules measures and dispenses a particular one of the constituent chemicals of the mixture. The relative concentration of each chemical in the mixture depends on the retention capacity of the vessel of the measure module associated with that chemical. In another embodiment, the output ports of two measure modules are coupled together to dilute a chemical concentrate with water. The diluted mixture is provided to other measure module pairs for further dilution, such that the system is able to provide several different dilutions (e.g., 10:1, 50:1, 100:1, etc.) of the concentrated chemical.

DETAILED DESCRIPTION

The present invention overcomes the problems associated with the prior art, by providing a novel system and method for measuring, blending, and delivering precise volumes of fluid. In the following description, numerous specific details are set forth (e.g. particular valve configurations, process automation, etc.) in order to provide a thorough understanding of the invention. Those skilled in the art will recognize, however, that the invention may be practiced apart from these specific details. In other instances, details of well-known fluid mixing practices (e.g. volumetric calculations for particular concentrations by reactant weight ratios) have been omitted, so as not to unnecessarily obscure the present invention.

Further, in the particular embodiments shown, the processes and component functions (e.g. valve operation, adjusting flow controllers to desired flow rates, etc.) are shown representationally to be automated using standard electronic control procedures (e.g. computer control). Those skilled in the art will recognize, however, that such processes and component functions may be controlled manually.

Figure 1:
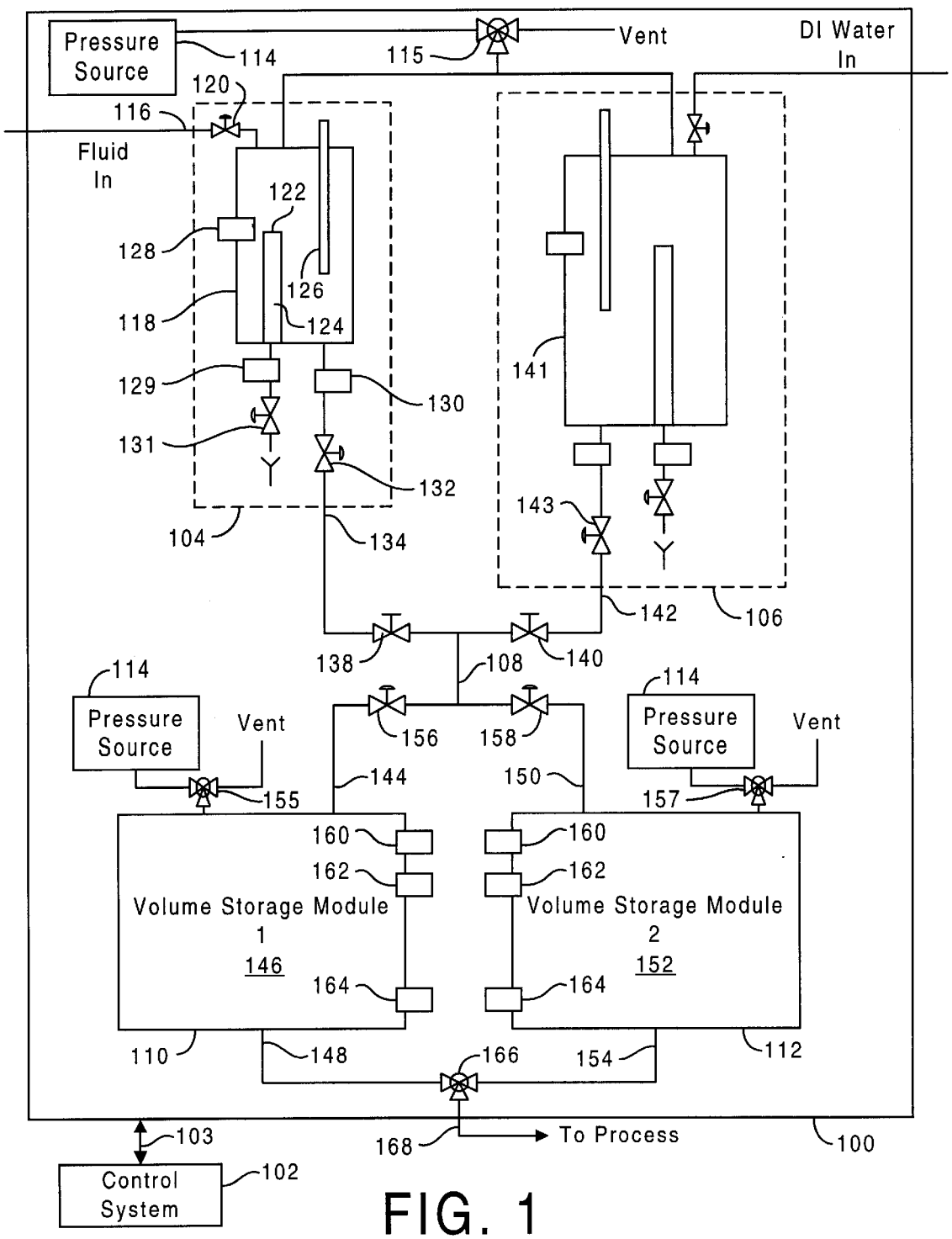
FIG. 1 shows one particular fluid delivery system according to the present invention.

FIG. 1 shows a schematic view of a fluid delivery system 100. Fluid delivery system 100 is electronically automated by control system 102. Control system 102 monitors and controls system 100 by receiving sensor signals and transmitting control signals over a communications network 103 (e.g., a field bus, a wiring harness, etc.). The interconnections between communications network 103 and the various valves and sensors of system 100 are not shown in FIG. 1, so as not to unnecessarily obscure other features of FIG. 1, but it should be understood that each of the valves and sensors of system 100 communicate with control system 102 via network 103.

Fluid delivery system 100 includes a first measure module 104, a second measure module 106, a fluid mixing line 108, a first volume storage module 110, and a second volume storage module 112. First measure module 104 dispenses a precise volume of a first fluid (e.g. a chemical concentrate), and second measure module 106 dispenses a precise volume of a second fluid (e.g. deionized water). The first fluid of measure module 104 and the second fluid of second measure module 106 are blended in fluid mixing line 108, and selectively delivered to either first volume storage module 110 or second volume storage module 112. Measure module 104, second measure module 106, volume storage module 110, and second volume storage module 112 are selectively pressurized by a pressure source 114 (e.g., compressed nitrogen gas) via a pressure valve 115.

If only repeated delivery of a predetermined quantity of a single fluid is required, second measure module 106 can be eliminated from the system. In addition, those skilled in the art will recognize that volume storage module 110 and second volume storage module 112 are optional components of system 100, and can be eliminated if storage of blended chemistry is not required.

Measure module 104 includes a fluid inlet port 116, a vessel 118, a shut-off valve 120, an overflow aperture 122, a calibrating device 126, a fill sensor 128, an overflow sensor 129, a discharge sensor 130, a drain valve 131, a fluid discharge valve 132, and a fluid outlet port 134. Fluid inlet port 116 couples vessel 118 to a source (not shown) of the chemical concentrate. Shut-off valve 120 allows or stops fluid flow through inlet port 116 into vessel 118 responsive to instructions from control system 102. Aperture 122 is disposed to define a predetermined retention capacity of vessel 118 by permitting excess fluid to flow out of vessel 118, through drain valve 131 to drain. In the particular embodiment shown, aperture 122 is embodied in the top of vertical drain tube 124, and the retention capacity of vessel 118 is grossly adjustable depending on the height of vertical drain tube 124.

Calibrating device 126 finely adjusts the predetermined retention capacity of vessel 118. In the embodiment shown calibrating device 126 comprises a vertically disposed rod that is adjustable to occupy a variable portion of the volume of vessel 118. Alternately, calibrating device 126 may comprise an inflatable bladder affixed within vessel 118 and below aperture 122. In another alternate embodiment, calibrating device 126 may also comprise slugs of varying size and having known volumes that would be placed within vessel 118 and below aperture 122 until the desired predetermined retention capacity is obtained.

Pressure valve 115 vents vessel 188 during the filling process. Fluid inlet valve 120 allows fluid to enter vessel 118 until one or both of sensors 128 and 129 detect the presence of fluid at their respective positions. Those skilled in the art will recognize that only one of fill sensor 128 and overflow sensor 129 are required to determine when vessel 118 is filled beyond aperture 122, however dual sensors facilitate a more accurate determination of when the predetermined retention capacity of vessel 118 has been exceeded, and quicker shut-off of valve 120. In this particular embodiment, fluid level sensor 128 is a Carlo Gavazzi capacitative sensor; part number EC3025NPAPL-10M.

Once sensors 128 and 129 determine that the retention capacity of vessel 118 has been exceeded, shut-off valve 120 is closed, and a brief time period is allowed for the fluid level within vessel 118 to settle at the level of aperture 122. During the settling period, fluid exiting vessel 118 via aperture 122 flows through drain valve 131 and into a drain. Completion of fluid settling can be determined from the output of one or both of sensors 128 and 129. Alternatively, a predetermined wait period sufficient to allow the fluid level to settle may be employed.

After the fluid level within vessel 118 has settled at the predetermined retention capacity, measure module 104 is ready to discharge the measured fluid. In this particular embodiment, drain valve 131 is closed, and pressure valve 115 couples vessel 118 with pressure source 114, thereby pressurizing vessel 118 to accelerate the discharge of fluid through fluid outlet port 134. Those skilled in the art will recognize, however, that pressurizing vessel 118 is not an essential element of the invention, and that the invention may be practiced, for example, by allowing vessel 118 to drain by gravity or other means.

After vessel 118 is closed, and responsive to instructions from control system 102, discharge valve 132 opens, allowing the fluid in vessel 118 to be dispensed from measure module 104 via fluid outlet port 134. Discharge sensor 130 generates a signal to indicate that the dispensing process is complete, when sensor 130 no longer senses the presence of fluid.

Second measure module 106 is similar to measure module 104 in both structure and function, except that measure module 106 typically delivers a second fluid that is chemically different from the fluid delivered by measure module 104. Accordingly, the predetermined retention capacity of second measure module 106 is selected with respect to the retention capacity of measure module 104 to yield a particular mix concentration when the fluids of the measure modules 104, 106 are mixed. In the case where the second fluid is deionized water, mixing the fluid of measure module 104 and the deionized water of second measure module 106 results in a precise dilution of the fluid of measure module 104.

The fluids dispensed from measure module 104 and second measure module 106 are blended in fluid mixing line 108. To control the rate of blending of the fluids, a flow controller 138 is interposed between fluid outlet port 134 and fluid mixing line 108, and a second flow controller 140 is interposed between a fluid outlet port 142 of second measure module 106 and fluid mixing line 108. Flow controllers 138 and 140 can be adjusted to deliver fluid at desired flow rates manually or by control system 102. Ideally, fluid dispensed by both measure module 104 and second measure module 106 are dispensed over the same time interval to facilitate uniform blending of the fluids.

Volume storage module 110 and second volume storage module 112 facilitate storage of batches of the blended fluid exiting fluid mixing line 108. Volume storage module 110 contains a fluid inlet port 144 for receiving blended fluid from fluid mixing line 108, a holding chamber 146 for storing blended fluid, and a fluid discharge port 148 for discharging stored fluid. Second volume storage module 112 is substantially similar to volume storage module 110, and includes a fluid inlet port 150, holding chamber 152, and a fluid discharge port 154. A pair of valves 155, 157 selectively pressurize or vent volume storage module 110 and second volume storage module 112, respectively, responsive to control signals from control system 102, in order to facilitate the filling and dispensing of fluid from volume storage modules 110, 112. While using two volume storage modules has the advantage that one volume storage module can provide fluid to a system process while the other volume storage module is being filled, using two volume storage modules is not an essential element of the invention, and the invention may be practiced with a single volume storage module or more than two volume storage modules.

A first steerage valve 156 and a second steerage valve 158 direct fluid flow into either volume storage module 110 or second volume storage module 112, responsive to control signals from control system 102. If a particular batch of fluid mixture from mixing line 108 is to be delivered to volume storage module 110, then steerage valve 158 is placed in the closed position and steerage valve 156 is placed in the open position, to direct fluid from mixing line 150 through steerage valve 156 and into volume storage module 110. On the other hand, if a particular batch of fluid mixture from mixing line 108 is to be delivered to second volume storage module 112, then steerage valve 158 is placed in the open position and steerage valve 156 is placed in the closed position, to direct fluid from mixing line 150 through steerage valve 158 and into second volume storage module 112. Optionally, steerage valves 156 and 158 are embodied in a single valve that selectively couples fluid mixing line 108 with volume storage module 110 and second volume storage module 112.

Volume storage module 110 and volume storage module 112 are fitted with sensors to provide feedback to control system 102 regarding the amount of fluid stored in volume storage modules 110 and 112. Each volume storage module is fitted with a fill signal sensor 160, a dispense signal sensor 162, and a low fluid sensor 164.

When the fluid level in volume storage module 110 falls below the fluid level defined by the placement of fill signal sensor 160, fill signal sensor 160 transmits a fill signal to control system 102. Upon receipt of the fill signal, control system 102 causes measure module 104 and second measure module 106 to fill to their respective predetermined retention capacities. Fill signal sensor 160 of second volume storage module 112 functions similarly.

When the fluid level in volume storage module 110 falls below the fluid level defined by the placement of dispense sensor 162, dispense signal sensor 162 transmits a dispense signal to control system 102. Upon receipt of a dispense signal from volume storage module 110, control system 102 sets valves 156 and 158, and causes measure module 104 and second measure module 106 to dispense their contents into volume storage module 110. Dispense sensor 162 of second volume storage module 112 functions similarly. In a particular embodiment the volume held in volume storage module 110 and second volume storage module 112 between fill signal sensor 160 and dispense signal sensor 162 comprises the total volume of fluid dispensed by measure module 104 and second measure module 106.

When the fluid level in volume storage module 110 falls below the fluid level defined by the placement of low fluid sensor 164, low fluid sensor 164 transmits a low fluid signal to control system 102 to indicate a dangerously low volume of fluid in volume storage module 110. In an alternate embodiment, volume storage module 110 and second volume storage module 112 have only a low fluid sensor instead of fill signal sensor 160 and dispense fluid sensor 162. In that embodiment, when the fluid level within volume storage module 110 reaches the level defined by the placement of low fluid sensor 164, low fluid sensor generates a low fluid signal to control system 102. Upon receipt of the low fluid signal, control system 102 transmits signals to measure module 104 and second measure module 106 causing them to both fill and dispense.

A process supply valve 166 selectively couples process supply port 168 with one of fluid discharge port 148 and fluid discharge port 154 of volume storage modules 110 and 112, respectively. Volume storage module 110 and second volume storage module 112 dispense their stored fluids to a system process, via process supply valve 166, out through a process supply port 168. In a particular embodiment, volume storage module 110 and second volume storage module 112, operate in alternating fashion. In particular, volume storage module 110 is vented and filled while second volume storage module 112 is pressurized and dispensing fluid, and vice versa.

Those skilled in the art will recognize that variations to the above-described fluid delivery system are possible without deviating from the scope of the invention. For example, an alternate embodiment of the present invention includes only one volume storage module 10, and fluid mixing line 108 is optional. If fluid mixing line 108 is omitted, fluid outlet port 134 and fluid outlet port 142 coupled directly to at least one fluid inlet port 144 of volume storage module 110. In another particular embodiment, fluid delivery system 100 comprises a single measure module 104 and no volume storage module. This particular embodiment is useful in applications (e.g., packaging systems, bottling systems, etc.) where repeated dispensations of a precise volume is required.

Figure 1A:
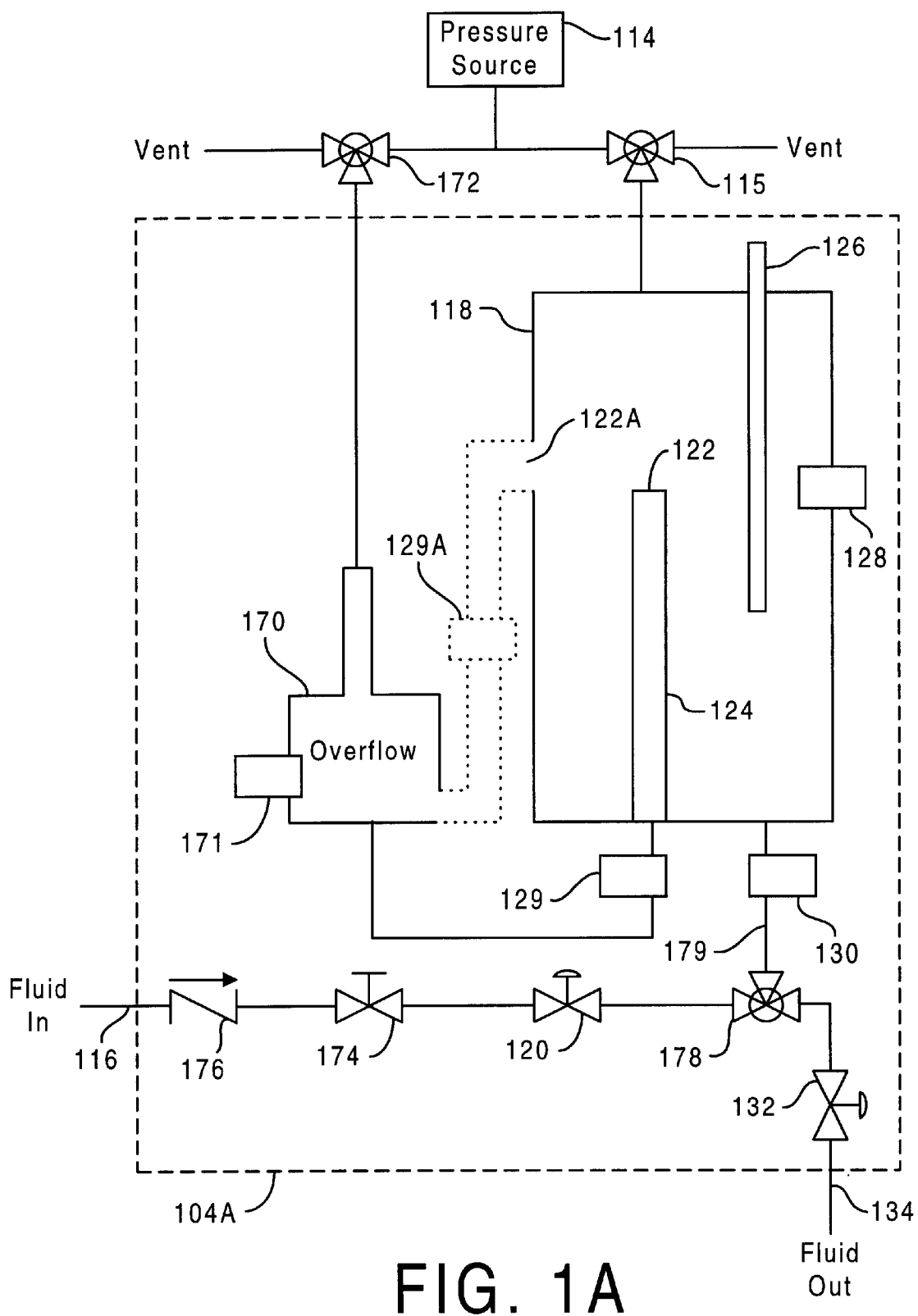
FIG. 1A shows a measure module of the fluid delivery system of FIG. 1.

FIG. 1A shows an alternate measure module 104A, which is similar to measure module 104, but is modified to conserve fluid and prevent the discharge of hazardous chemicals into a drain. Measure module 104A includes an overflow reservoir 170, an overflow pressure valve 172, an inlet flow controller 174, an inlet check valve 176, and a directional valve 178.

Overflow reservoir 170 receives and stores excess fluid that flows out of vessel 118 via aperture 122 during a fill cycle. Overflow pressure valve 172 selectively couples overflow reservoir 170 with pressure source 114, so that overflow reservoir 170 can be pressurized to push any fluid stored in reservoir 70 back into vessel 118 at the beginning of the next fill cycle. Overflow reservoir 170 thus prevents unnecessary fluid loss, which results in cost savings, particularly if the fluid being dispensed is relatively expensive. In addition, overflow reservoir. 170 helps reduce disposal costs for chemicals which cannot be discharged into public wastewater systems without treatment. A fill sensor 171 in overflow reservoir 170 serves as an alternate or redundant sensor to fill sensor 128, by detecting the presence of liquid in overflow reservoir 170.

Those skilled in the art will realize, however, that overflow reservoir 170 (as well as other elements, even if not specifically mentioned) is not an essential element of the present invention. For example, if the excess fluid flowing out of vessel 118 were water, overflow reservoir 170 would not be needed to retain the excess fluid because water is both inexpensive, and environmentally safe. As shown in the embodiment of FIG. 1, such innocuous fluids can be discharged directly into a drain.

Measure module 104A also differs from measure module 104 in that fluid flows into and out of vessel 118 via a common line 179. Directional valve 178 selectively couples common line 179 with fluid inlet port 116 and fluid outlet port 134 to fill and discharge from vessel 118, respectively. During a fill cycle, incoming fluid flows in through inlet port 116, through valves 176, 174, 120, and 178, through common line 179, past sensor 130, and finally into vessel 118. Inlet check valve 176 limits fluid flow entering measure module 104A to a single direction. Inlet flow controller 174 controls the flow rate of fluid entering vessel 118 in order to reduce ebullition of the fluid as it enters vessel 118. Shut-off valve 120 starts and stops the flow of incoming fluid. During a discharge cycle, fluid flows out of vessel 118, through common line 179, through directional valve 178, through discharge valve 132, and out fluid outlet port 134.

An alternate overflow aperture 122A and an alternate overflow sensor 129A are shown in dashed lines in FIG. 1A to make clear that it is not essential for, overflow aperture 122 to be disposed atop a vertical drain tube. For example, aperture 122A is disposed in the wall of vessel 118. Nevertheless, the position of aperture 122A will roughly define the retention capacity of vessel 118, the same as overflow aperture 122.

Figure 1B:
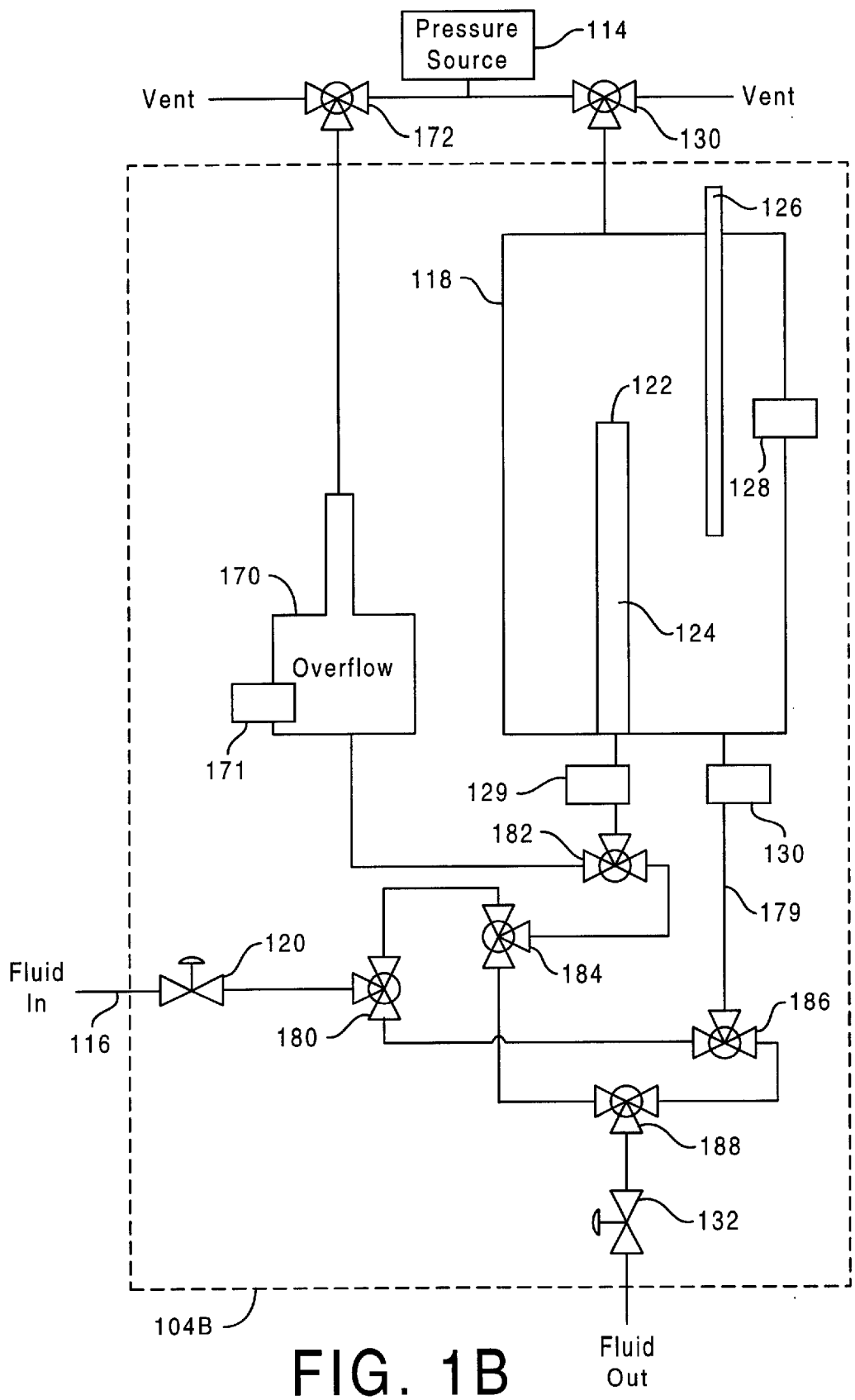
FIG. 1B shows an alternate measure module for use with the fluid delivery system of FIG. 1.

FIG. 1B shows another alternate measure module 104B. Measure module 104B is similar to measure module 104A, but is modified to include a vessel selection fill valve 180, an overflow selection valve 182, a first vessel valve 184, a second vessel valve 186, and a discharge selection valve 188. These valves are coupled as shown in FIG. 1B to facilitate the selective use of either vessel 118 or vertical drain tube 124 as the vessel whose retention capacity determines the output of measure module 104B. In other words, measure module 104B can selectively deliver precise volumes of fluid corresponding to either the predetermined retention capacity of vessel 118 or the predetermined retention capacity of vertical drain tube 124.

In a first mode of operation, measure module 104B operates similar to measure modules 104 and 104A described above. During the fill process, vessel selection fill valve 180 and second vessel valve 186 couples fluid inlet port 116 with common line 179 to allow fluid to flow into vessel 118. Overflow selection valve 182 couples vertical drain tube 124 with overflow reservoir 170 to direct the flow of excess fluid into overflow reservoir 170. During the discharge process, second vessel valve 186 and discharge selection valve 188 couple common line 179 with fluid outlet port 134, to allow fluid from vessel 118 to flow out of fluid outlet port 134. As in previously described embodiments, fluid discharge valve 132 selectively allows or interrupts the flow of fluid out of measure module 104B.

In a second mode of operation, vertical drain tube 124 is used to measure the fluid instead of vessel 118, thereby facilitating precise volumetric metering of a small amount of fluid, and vessel 118 serves as an overflow reservoir. During a fill process in the second mode of operation, vessel selection fill valve 180, first vessel valve 184, and overflow selection valve 182 couple vertical drain tube 124 with fluid inlet port 116, to allow fluid to flow into vertical drain tube 124. Shut-off valve 120 allows fluid to flow into vertical drain tube 124 until fluid overflowing from vertical drain tube 124 is sensed by discharge sensor 130.

During the discharge process, in the second mode of operation, the fluid retained in vertical drain tube 124 is discharged out of measure module 104B via fluid outlet port 134. To facilitate discharge of the fluid from vertical drain tube 124, overflow selection valve 182, first vessel valve 184 and discharge selection valve 188 couple vertical drain tube 124 with fluid outlet port 134, via discharge valve 132. Fluid delivery continues until overflow sensor 129 senses that no fluid is flowing out of vertical drain tube 124.

Any fluid remaining in vessel 118 can be handled in a number of ways. For example, if the next fill cycle is to occur under the first mode of operation (filling vessel 118) then the fluid can simply be left in vessel 118. However, if the next fill cycle is to occur under the second mode of operation (filling drain tube 124) then the excess fluid in vessel 118 can be evacuated by coupling vessel 118 with overflow reservoir 170 (e.g., via common line 179, valve 186, valve 188, valve 184 and valve 182), and pressurizing vessel 118 to force the retained fluid into overflow reservoir 170.

Figure 2:
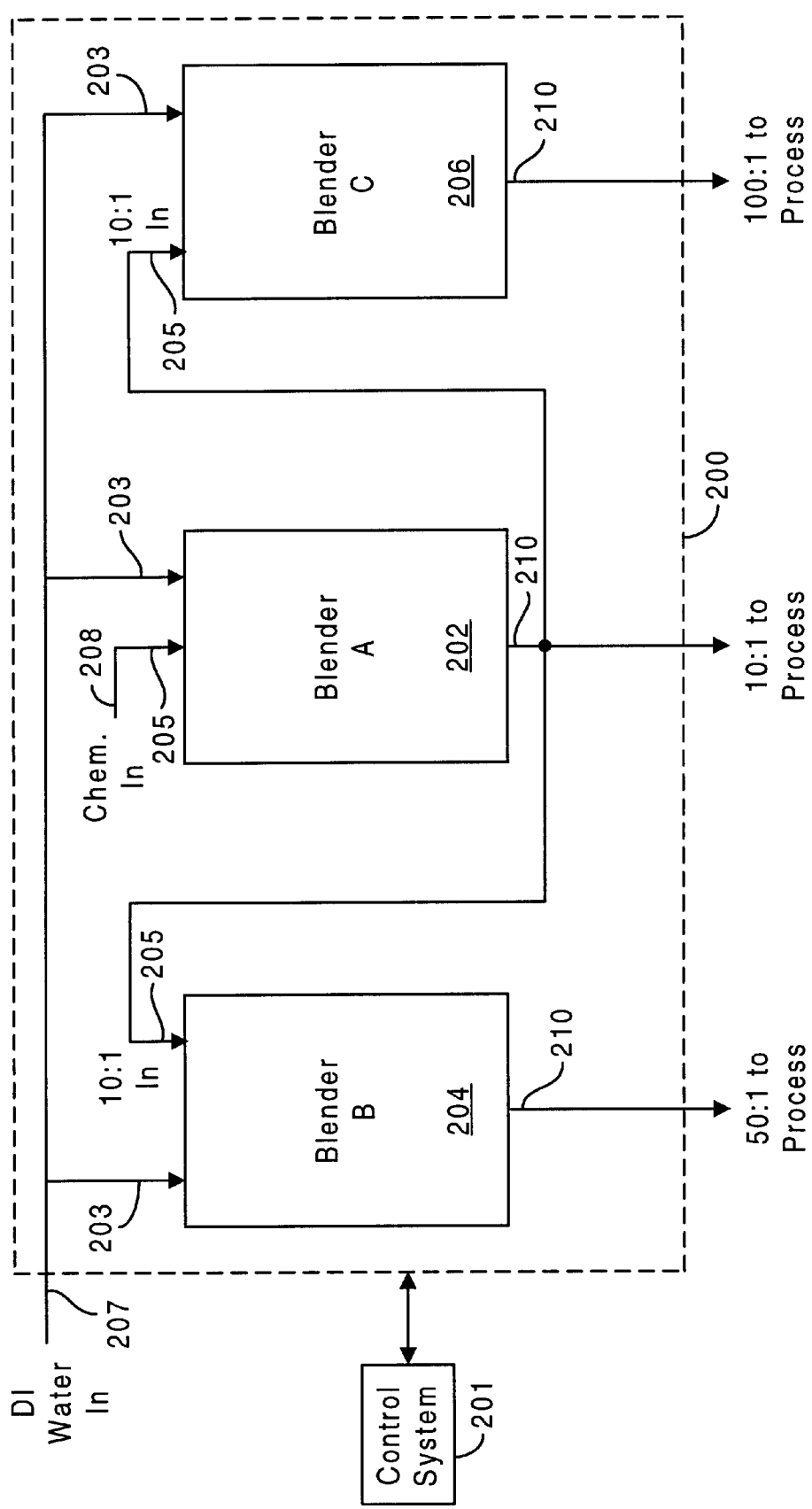
FIG. 2 shows an alternate fluid delivery system according to the present invention.

FIG. 2 shows a dilution system 200 that supplies multiple dilution ratios of a concentrate fluid to one or more system processes. Dilution system 200 includes a first blender (A) 202, a second blender (B) 204, and a third blender (C) 206. Each of blenders 202, 204, and 206 are substantially similar to fluid delivery system 100, described in FIG. 1, and may include any of alternate measure modules 104, 104A, or 104B. The components of dilution system 200 are controlled by a control system 201, via a field bus system (not shown).

Each of fluid delivery systems 202, 204, and 206 includes a first fluid inlet port 203 coupled to receive a diluting fluid (typically deionized water) via a fluid supply line 207. Each of fluid delivery systems 202, 204, and 206 also includes a second fluid inlet port 205, for receiving a concentrate fluid, and a fluid outlet port 210 for dispensing a mixture of the diluting fluid and the concentrate.

Second fluid inlet port 205 of blender A 202 is coupled to receive a concentrated fluid (e.g., sulfuric acid), via a fluid supply line 208. Blender A 202 blends the concentrated fluid with the diluting fluid to obtain a mixture with the desired concentration. The concentration of the mixture depends on the relative capacities of the measure modules (not shown in FIG. 3) of blender 202. In this particular example, a 10:1 mix ratio is obtained. In other words, the concentration of diluted fluid exiting fluid outlet port 210 is exactly $\frac{1}{10}$ the concentration of the fluid entering fluid delivery system 202 via fluid input line 208.

Blender B 204 facilitates further dilution of the diluted fluid produced by blender A 202. Second fluid input port 210 of blender B 204 is coupled to received fluid from fluid output port 210 of blender A. In this particular embodiment, the relative capacities of the measure modules of blender B 204 are 5:1, such that blender B 204 dilutes the fluid received via second fluid inlet port 205 with the diluting fluid received via first fluid inlet port 203 to obtain a mixture with $1/5$ the concentration of the incoming fluid. Therefore, the concentration ratio of the fluid produced by blender B 204 from the fluid received from blender A 202 is $1/50$ ($1/10 \times 1/5$) the concentration of the chemical concentrate supplied by supply line 208.

Blender C 206 also facilitates further dilution of the diluted fluid produced by blender A 202 to yield a fluid having yet another concentration. Second fluid input port 210 of blender C 206 is coupled to received fluid from fluid output port 210 of blender A. In this particular embodiment, the relative capacities of the measure modules of blender C 206 are the same as blender A 202 (10:1), such that blender C 206 dilutes the fluid received via second fluid inlet port 205 with the diluting fluid received via first fluid inlet port 203 to obtain a mixture with $1/10$ the concentration of the incoming fluid. Therefore, the concentration ratio of the fluid produced by blender B 204 from the fluid received from blender A 202 is $1/100$ ($1/10 \times 1/10$) the concentration of the chemical concentrate supplied by supply line 208.

As described above, dilution system 200 is able to simultaneously provide three different dilutions (10:1, 50:1, and 100:1) of the chemical concentrate supplied via supply line 208. Those skilled in the art will recognize, however, that dilution system 200 is not limited to the example dilution ratios shown therein, and may be adapted to provide more and/or different concentrations than those shown. In fact, it is contemplated that the measure modules of the blenders be easily interchangeable, so that the blenders can be easily modified to produce any desired concentrations that are required to meet the needs of an individual user.

Figure 3:
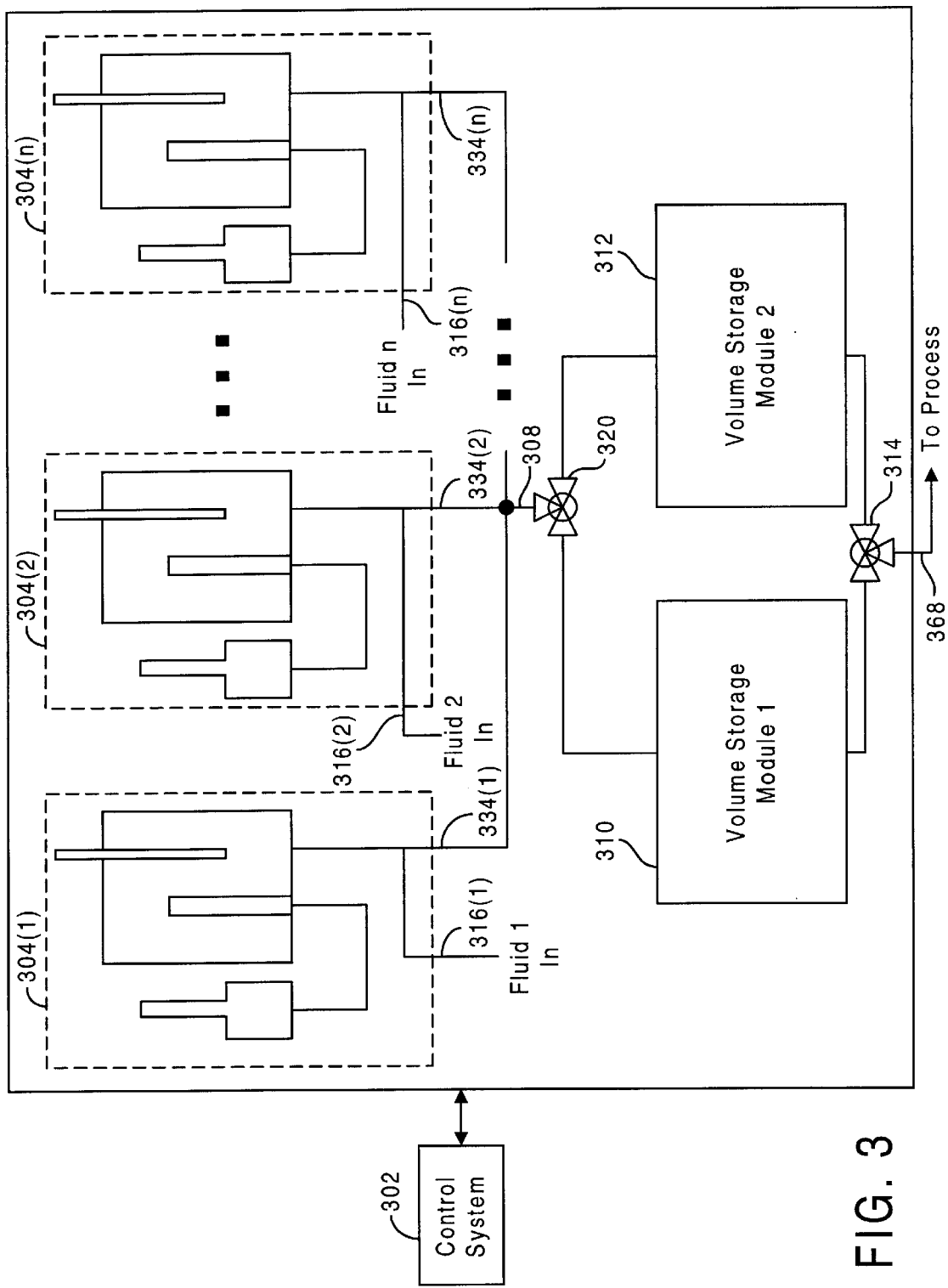
FIG. 3 shows another alternate fluid delivery system according to the present invention.

FIG. 3 shows a fluid delivery system 300 for blending more than two different fluids, as is required in many applications. Fluid delivery system 300 includes control system 302, a plurality of measure modules 304(1-$n$), a fluid mixing line 308, a first volume storage module 310, a second volume storage module 312, and a discharge selection valve 314. Measure modules 304(1-$n$) are substantially similar to the measure modules 104, 104A or 104B described above. However, the details of each measure module 304(1-$n$) are omitted from FIG. 3 so as not to unnecessarily obscure the features of the present invention emphasized therein.

Each of measure modules 304(1-$n$) includes a fluid inlet port 316 and a fluid outlet port 334. Each of measure modules 304(1-$n$) receives a particular fluid constituent of the blended product via its respective fluid inlet port 316(1-$n$). Responsive to a signal from control system 302, each of measure modules 304(1-$n$) dispenses a predetermined volume of its respective fluid, via its respective fluid outlet port 334(1-$n$), into fluid mixing line 308. The blended fluid exiting fluid mixing line 308 is directed into either volume storage module 310 or second volume storage module 312 by steering valve 320. Discharge selection valve 314 selectively couples one of volume storage module 310 and second volume storage module 312 to process supply port 368 to supply blended fluid to system process.

The present embodiment illustrates many advantages associated with the present invention. For example, many different fluids can be blended into a precise volume of a complex fluid having a known concentration of each of the constituent fluids. Further, having many measure modules operating in parallel facilitates the delivery of larger quantities of deliverable chemistry.

Figure 4:
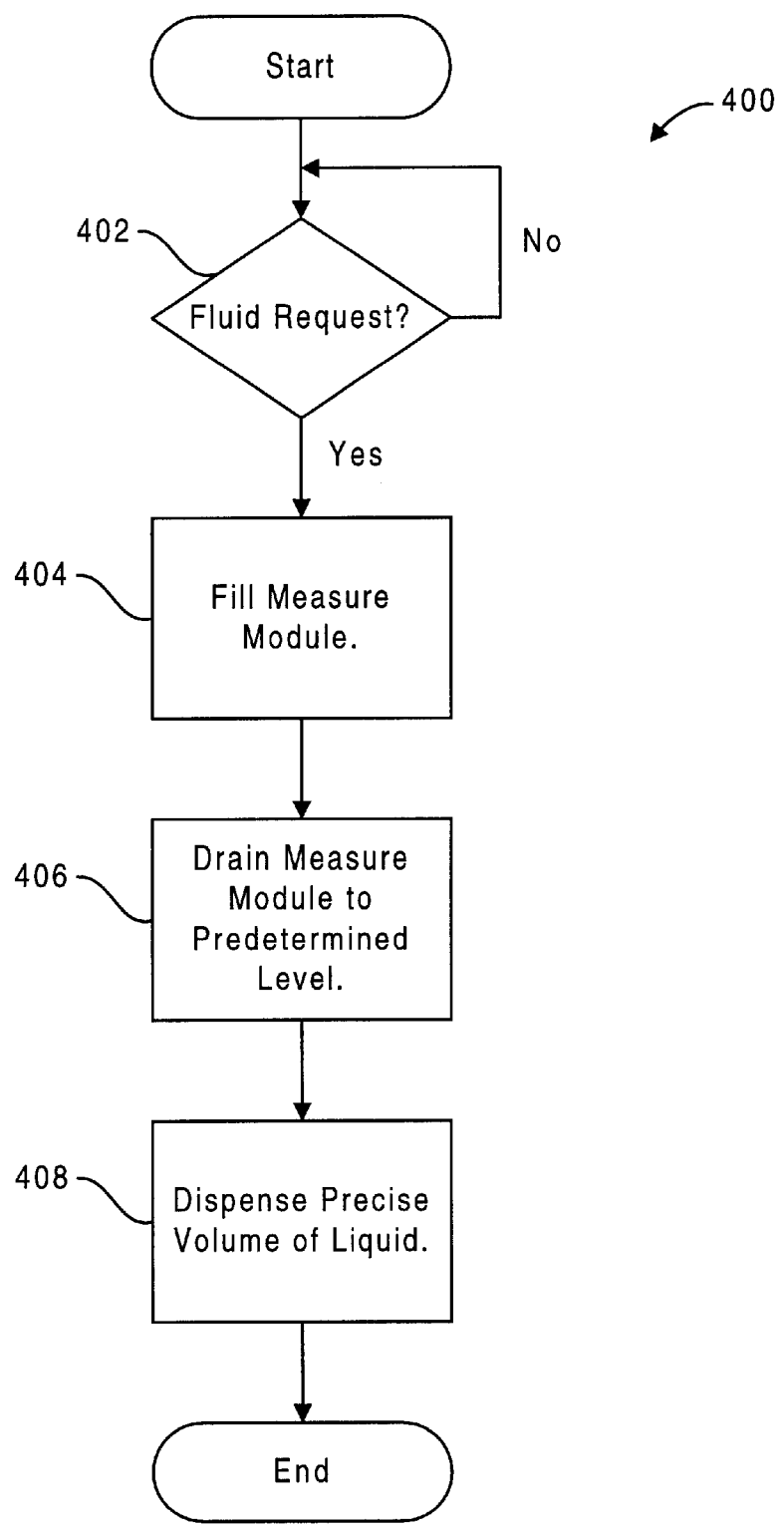
FIG. 4 is a flow chart summarizing one particular method for dispensing a precise volume of fluid from a measure module according to the present invention.

FIG. 4 shows a flowchart summarizing a method 400 for dispensing a precise volume of fluid from a measure module according to the present invention. In a first step 402, control system 102 determines whether there is a fluid delivery request (e.g., a signal from one of volume storage modules 146, 152). If in first step 402, control system 102 does not detect a fluid delivery request is, then control system 102 repeats first step 402 until a request is detected. If, however, in first step 402, control system 102 detects a fluid delivery request, then method 400 proceeds to a second step 404 where control system 102 opens shut-off valve 120, allowing fluid to flow into vessel 118 until vessel 118 is filled beyond its predetermined retention capacity. Then, in a third step 406, control system 102 closes shut-off valve 120, and the excess fluid contained within vessel 118 is drained, via aperture 122, until the fluid volume within vessel 118 settles at the predetermined retention capacity of vessel 118. Next, in a fourth step 408 control system 102 opens fluid discharge valve 132 to dispensing the precise volume of stored fluid from vessel 118 out through fluid outlet port 134. Then method 400 ends.

Figure 5:
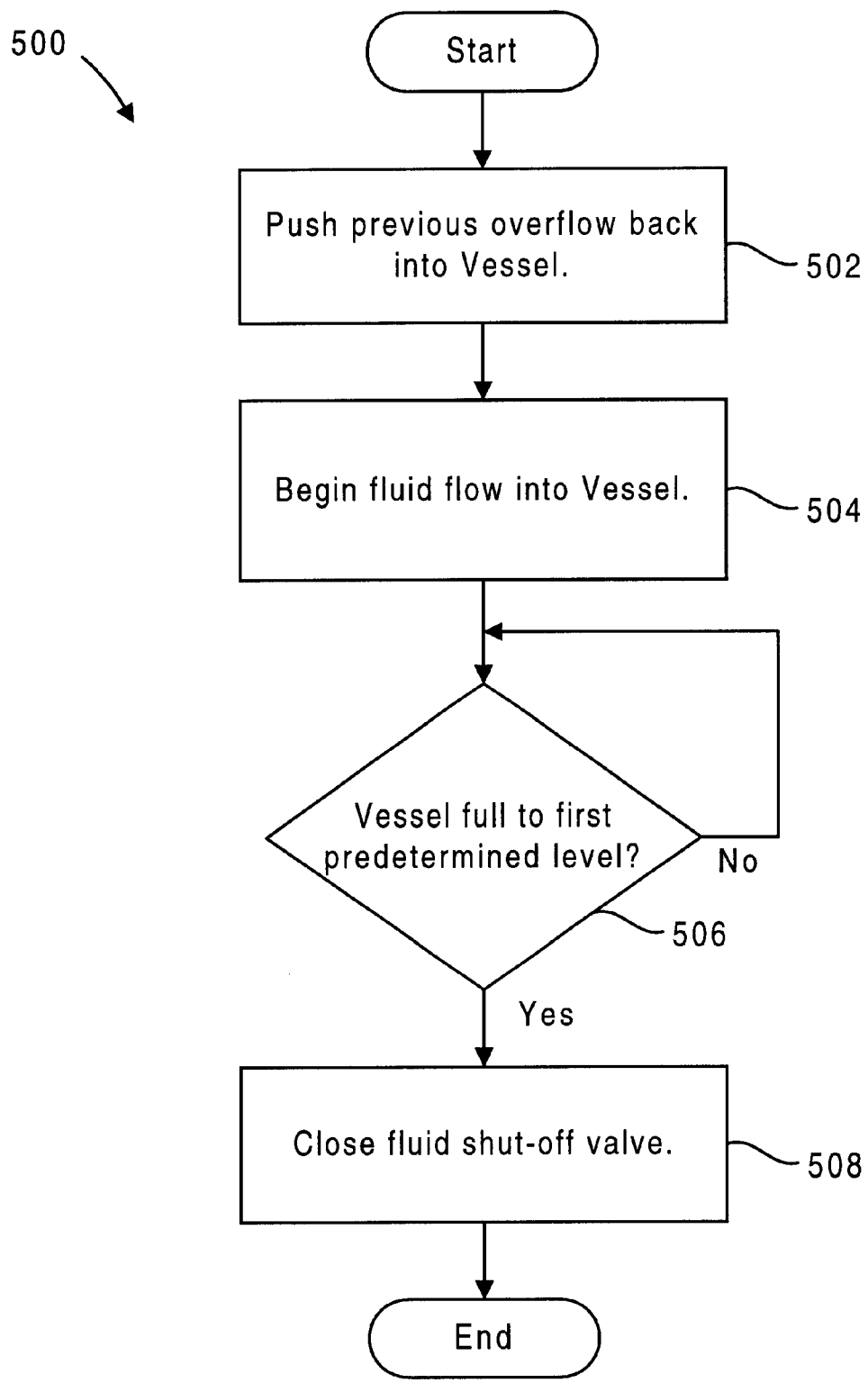
FIG. 5 is a flow chart summarizing one method of performing the "Fill Measure Module" step of FIG. 4.

FIG. 5 shows a flowchart summarizing a method 500 of performing step 404 of method 400 for filling a measure module (e.g., 104, 104A, or 104B) according to the present invention. In a first step 502 control system 102 vents vessel 118 and pressurizes overflow reservoir 170 to transfer any excess fluid retained in overflow reservoir 170 back into vessel 118 via aperture 122. Then, in a second step 504, control system opens shut-off valve 120 to begin filling vessel 118 via fluid inlet port 116. Next, in a third step 506, control system 102 determines whether the level of fluid in vessel 118 has exceeded the predetermined retention capacity of vessel 118 (e.g., by sensor 129 sensing overflow fluid). Third step 506 is repeated while vessel 118 fills, until the fluid level in vessel 118 exceeds its retention capacity. Then, in a fourth step 508 control system 102 closes shut-off valve 120 to halt fluid delivery to vessel 118.

Figure 6:
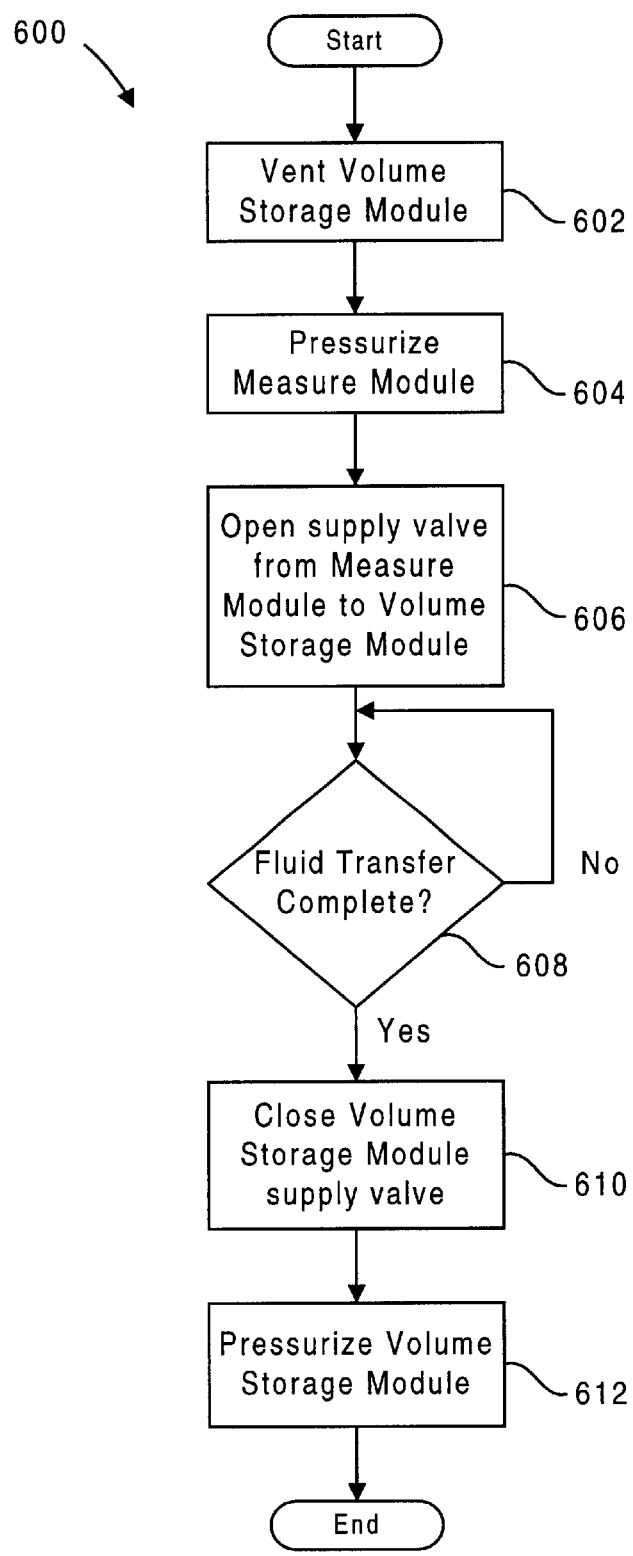
FIG. 6 is a flow chart summarizing one method of performing the "Dispense Precise Volume of Fluid" step of FIG. 4.

FIG. 6 shows a flowchart summarizing one method 600 for dispensing a precise volume of fluid according to fourth step 408 of method 400. For the purposes of this example, volume storage module 110 is intended to be the recipient of the dispensed fluid of measure module 104, but it should be clear that method 600 can also be used to dispense fluid into second volume storage module 152, or to any other container or process. In a first step 602, control system 102 vents volume storage module 110, via valve 155, to depressurize volume storage module 110. Then, in a second step 604, control system 102 pressurizes vessel 118, via valve 115, to urge the retained fluid out of vessel 118. In a third step 606, control system 102 opens discharge valve 132 to allow the pressurized fluid flow from vessel 118, via fluid outlet port 134, to volume storage module 110. In a fourth step 608, control system 102 checks to determine whether all of the fluid has been transferred from measure module 104 to volume storage module 110. Fourth step 608 is continued as long as discharge sensor 130 indicates that fluid is still flowing from vessel 118. When the discharge of fluid is complete, then in fifth step 610, steerage valve 156 closes to stop any fluid from entering or exiting (e.g. blended fluid or pressurized gas) volume storage module 110. Next, in a sixth step 612, volume storage module 110 is coupled, via valve 155, with pressure source 114, to repressurize volume storage module 110. Then method 600 ends.

Figure 7:
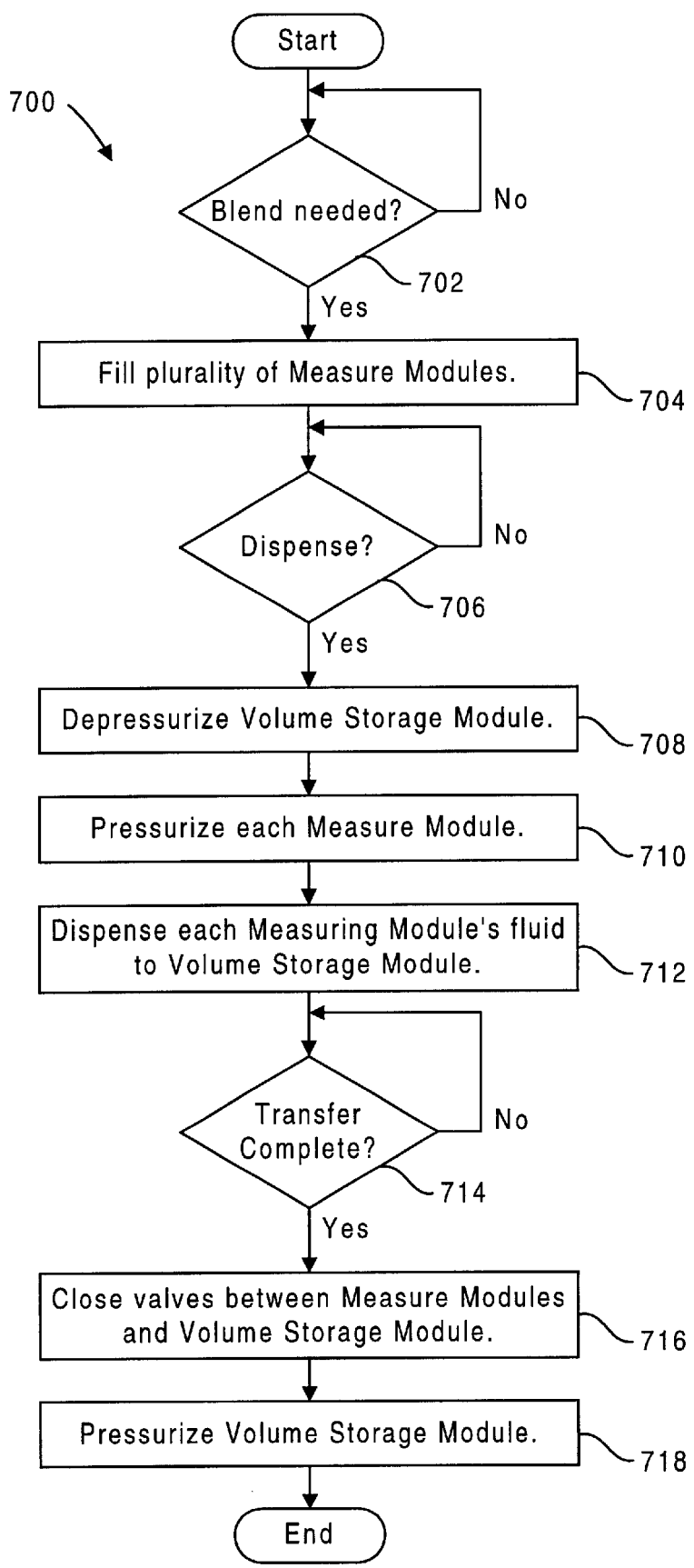
FIG. 7 is a flow chart summarizing one particular method of accurately blending a plurality of fluids according to the present invention.

FIG. 7 shows a flowchart 700 summarizing a method of accurately blending a plurality of fluids in accordance with the present invention. In a first step 702, control system 102 waits for a fill signal from volume storage module 110 or second volume storage module 112 indicating that a batch of the blended fluid is required. Upon receipt of a fill signal, then in a second step 704, control system fills vessel 118 of first measure module 104 with a first fluid, and fills vessel 141 of second measure module 106 with a second fluid. In a third step 706 control system 102 waits for a dispense signal from volume storage module 110 or second volume storage module 112.

Once a dispense signal is received (e.g., from volume storage module 146), then in a fourth step 708, control system 102 depressurizes volume storage module 146. Next, in a fifth step 710, control system 102 pressurizes vessel 118 of measure module 104 and vessel 141 of measure module 106. In a sixth step 712, the discharge valves (e.g., 132) of each of measure modules 104 and 106 are opened to allow the fluids contained in the respective measure modules to flow into mixing line 108 at a rate determined by flow controllers 138 and 140. Control system 102 directs the flow of blended fluid from mixing line 108 into the volume storage module 146 by opening steerage valve 156 and closing steerage valve 158.

In a seventh step 714, control system 102 monitors the discharge sensors (e.g., sensor 130) to determine when measure modules 104 and 106 have finished transferring their entire contents to volume storage module 146. Then, in an eighth step 716, control system 102 closes steerage valve 156, fluid discharge valve 132, and fluid discharge valve 143, and in a ninth step 718, repressurizes volume storage module 160 to facilitate delivery of fluid to a system process.

While the example method described above includes filling two measure modules with fluid, those skilled in the art will understand that method 700 can be implemented with any desirable number of measure modules, as suggested by the embodiment of FIG. 3.

The description of particular embodiments of the present invention is now complete. Many of the described features may be substituted, altered or omitted without departing from the scope of the invention. For example, alternate calibrating devices 126 (e.g. slugs having predetermined volume, inflatable bladders, etc.), may be substituted in place of a calibrating rod. As another example, while the embodiment of FIG. 3 shows blending a plurality of different fluids in parallel, and the embodiment of FIG. 2 shows the repeated, sequential dilution of a chemical, those skilled in the art will understand that various combinations of both parallel and sequential mixing schemes are within the scope of the present invention. For example, two or more different chemicals can be mixed in parallel, and then the resultant mixture can be mixed with yet other chemicals. These and other deviations from the particular embodiments shown will be apparent to those skilled in the art, particularly in view of the foregoing disclosure.

We claim:

1. A fluid delivery system comprising:
a measure module including a fluid inlet port, a vessel for receiving and retaining a fluid via said fluid inlet port, an aperture positioned to define a predetermined retention capacity of said vessel by allowing excess fluid to flow out of said vessel, and a fluid outlet port for dispensing said retained fluid;
a second measure module including a fluid inlet port, a vessel for receiving and retaining a second fluid via said fluid inlet port, an aperture positioned to define a predetermined retention capacity of said vessel by allowing excess second fluid to flow out of said vessel, and a fluid outlet port for dispensing said retained second fluid;
a fluid mixing line coupled to receive said fluid from said first measure module, and to receive said second fluid from said second measure module; and
a volume storage module including a fluid inlet port for receiving a blended fluid from said fluid mixing line, a holding chamber for storing said blended fluid received from said fluid mixing line, and at least one fluid discharge port for discharging said stored fluid from said holding chamber.

2. A fluid delivery system according to claim 1, wherein the position of said aperture of said measure module is adjustable.

3. A fluid delivery system according to claim 2, wherein said aperture of said measure module is disposed on a vertical drain tube inside said vessel.

4. A fluid delivery system according to claim 2, wherein said aperture of said measure module is disposed in a wall of said vessel.

5. A fluid delivery system according to claim 1, further comprising a calibrating device for occupying a portion of said predetermined retention capacity of said vessel of said measure module.

6. A fluid delivery system according to claim 5, wherein said calibrating device comprises an adjustable rod.

7. A fluid delivery system according to claim 1, further comprising an overflow reservoir in fluid communication with said aperture of said measure module for retaining said excess fluid flowing out of said aperture.

8. A fluid delivery system according to claim 7, wherein said overflow reservoir includes an inlet valve to facilitate selective pressurization.

9. A fluid delivery system according to claim 8, wherein said overflow reservoir contains at least one sensor to detect the flow of said excess fluid into said overflow reservoir.

10. A fluid delivery system according to claim 1, wherein said measure module contains at least one sensor for determining when the volume of said fluid inside said vessel exceeds said predetermined retention capacity.

11. A fluid delivery system according to claim 10, wherein said sensor is adapted to sense said fluid flowing out of said vessel through said aperture.

12. A fluid delivery system according to claim 10, wherein said sensor is adapted to sense when said fluid level of said vessel has settled at said predetermined retention capacity.

13. A fluid delivery system according to claim 1, further comprising a valve for selectively coupling said vessel of said measure module to said fluid inlet port and said fluid outlet port.

14. A fluid delivery system according to claim 1, wherein said fluid outlet port of said measure module contains at least one sensor for detecting fluid flow out of said vessel.

15. A fluid delivery system according to claim 1, further comprising a flow controller to control the fluid flow rate through said outlet port of said measure module.

16. A fluid delivery system according to claim 1, further comprising a pressure valve for selectively coupling said vessel of said measure module with a pressure source.

17. A fluid delivery system according to claim 1, wherein said outlet port of said second measure module and said outlet port of said measure module are coupled to said fluid mixing line.

18. A fluid delivery system according to claim 1, further comprising at least one flow controller interposed between said fluid mixing line and one of said outlet ports of said measure module and said second measure module.

19. A fluid delivery system according to claim 1, wherein said volume storage module contains at least one sensor for generating a fill signal to said measure module and said second measure module.

20. A fluid delivery system according to claim 1, wherein said volume storage module contains at least one sensor for generating a dispense fluid signal to said measure module and said second measure module.

21. A fluid delivery system according to claim 1, further comprising a pressure valve to selectively couple said holding chamber of said volume storage module with a pressure source.

22. A fluid delivery system according to claim 1, further comprising an outlet valve coupled to said fluid discharge port to selectively facilitate fluid flow out of said volume storage module.

23. A fluid delivery system according to claim 1, further comprising a second volume storage module, including:
    a fluid inlet port for receiving said blended fluid from said fluid mixing line;
    a holding chamber for storing said blended fluid received from said fluid mixing line; and
    at least one fluid discharge port for discharging said stored fluid from said holding chamber.

24. A fluid delivery system according to claim 23, further comprising a first steerage valve for selectively coupling said fluid mixing line with said fluid inlet port of said volume storage module.

25. A fluid delivery system according to claim 23, further comprising a second steerage valve for selectively coupling said fluid mixing line with said fluid inlet port of said second volume storage module.

26. A fluid delivery system according to claim 23, wherein said fluid delivery system includes a process supply port for providing said blended fluid to a processing system; and at least one valve for selectively coupling said process supply port with one of said fluid discharge port of said volume storage module and said fluid discharge port of said second volume storage module.

27. A fluid delivery system according to claim 23, wherein said volume storage module receives said blended fluid from said fluid mixing line while said second volume storage module dispenses said stored blended fluid via said process supply port.

28. A fluid delivery system according to claim 1, further comprising a third measure module, said third measure module comprising:
    a fluid inlet port;
    a vessel for receiving and retaining a third fluid via said fluid inlet port;
    an aperture positioned to define a predetermined retention capacity of said vessel by allowing excess third fluid to flow out of said vessel; and
    a fluid outlet port for dispensing said retained third fluid.

29. A fluid delivery system according to claim 28, wherein said fluid outlet port of said third measure module is coupled to said fluid outlet port of said measure module and to said fluid outlet port of said second measure module via said fluid mixing line.

30. A fluid delivery system according to claim 28, wherein said fluid inlet port of said third measure module is coupled to said fluid mixing line to receive said blended fluid.

31. A fluid delivery system according to claim 30, wherein a volume storage module is interposed between said fluid mixing line and said fluid inlet port of said third measure module.

32. A fluid delivery system according to claim 28, further comprising a fourth measure module, said fourth measure module comprising:
    a fluid inlet port;
    a vessel for receiving and retaining a fourth fluid via said fluid inlet port;
    an aperture positioned to define a predetermined retention capacity of said vessel by allowing excess fourth fluid to flow out of said vessel; and
    a fluid outlet port for dispensing said retained fourth fluid.

33. A fluid delivery system according to claim 32, wherein said fluid outlet port of said fourth measure module and said fluid outlet port of said third measure module are coupled to a second fluid mixing line.

34. A fluid delivery system according to claim 33, wherein said fluid inlet port of said fourth measure module is coupled to receive said second fluid.

35. A fluid delivery system according to claim 33, wherein said second fluid mixing line is coupled to a process supply port.

36. A fluid delivery system according to claim 35, wherein a volume storage module is interposed between said second fluid mixing line and said process supply port.

37. A fluid delivery system comprising:
    a measure module including a fluid inlet port, a vessel for receiving a fluid via said fluid inlet port, and for retaining a predetermined volume of said fluid, overflow means for releasing fluid in excess of said predetermined volume from said vessel, and a fluid outlet port for dispensing said retained fluid;
    a second measure module including a fluid inlet port, a vessel for receiving a second fluid via said fluid inlet port, and for retaining a predetermined volume of said second fluid, overflow means for releasing fluid in excess of said predetermined volume from said vessel of said second measure module, and a fluid outlet port for dispensing said retained second fluid;
    a third measure module including a fluid inlet port, a vessel for receiving a third fluid via said fluid inlet port, and for retaining a predetermined volume of said third fluid, overflow means for releasing fluid in excess of said predetermined volume from said vessel of said third measure module, and a fluid outlet port for dispensing said retained third fluid; and
    wherein said fluid inlet port of said third measure module is coupled to receive fluid from said outlet ports of said measure module and said second measure module.

38. A fluid delivery system according to claim 37, further comprising a means for blending the fluid dispensed by said measure module with said fluid dispensed by said second measure module.

39. A fluid delivery system according to claim 37, further comprising a means for blending the fluids dispensed by said measure module, said second measure module, and said third measure module.

40. A fluid delivery system comprising:
    a measure module including a fluid inlet port, a vessel for receiving and retaining a fluid via said fluid inlet port, an aperture positioned to define a predetermined retention capacity of said vessel by allowing excess fluid to flow out of said vessel, and a fluid outlet port for dispensing said retained fluid;
    an overflow reservoir in fluid communication with said aperture for retaining said excess fluid flowing out of said aperture, said overflow reservoir including an inlet valve to facilitate selective pressurization; and at least one sensor to detect the flow of said excess fluid into said overflow reservoir.

41. A fluid delivery system comprising:

a measure module including a fluid inlet port, a vessel for receiving and retaining a fluid via said fluid inlet port, an aperture positioned to define a predetermined retention capacity of said vessel by allowing excess fluid to flow out of said vessel, and a fluid outlet port for dispensing said retained fluid;

a second measure module including a fluid inlet port, a vessel for receiving and retaining a second fluid via said fluid inlet port, an aperture positioned to define a predetermined retention capacity of said vessel by allowing excess second fluid to flow out of said vessel, and a fluid outlet port for dispensing said retained second fluid;

a third measure module including a fluid inlet port, a vessel for receiving and retaining a third fluid via said fluid inlet port, an aperture positioned to define a predetermined retention capacity of said vessel by allowing excess third fluid to flow out of said vessel, and a fluid outlet port for dispensing said retained third fluid; and a fluid mixing line coupling said output ports of said measure module and said second measure module with said fluid inlet port of said third measure module.

42. A fluid delivery system comprising:

a measure module including a fluid inlet port, a vessel for receiving and retaining a fluid via said fluid inlet port, an aperture positioned to define a predetermined retention capacity of said vessel by allowing excess fluid to flow out of said vessel, and a fluid outlet port for dispensing said retained fluid;

a second measure module including a fluid inlet port, a vessel for receiving and retaining a second fluid via said fluid inlet port, an aperture positioned to define a predetermined retention capacity of said vessel by allowing excess second fluid to flow out of said vessel, and a fluid outlet port for dispensing said retained second fluid;

a fluid mixing line coupled to said fluid outlet port of said first measure module and said fluid outlet port of said second measure module;

a third measure module including a fluid inlet port coupled to said fluid mixing line, a vessel for receiving and retaining a third fluid via said fluid inlet port, an aperture positioned to define a predetermined retention capacity of said vessel by allowing excess third fluid to flow out of said vessel, and a fluid outlet port for dispensing said retained third fluid, said third fluid being a blend of said fluid and said second fluid;

a fourth measure module including a fluid inlet port, a vessel for receiving and retaining a fourth fluid via said fluid inlet port, an aperture positioned to define a predetermined retention capacity of said vessel by allowing excess fourth fluid to flow out of said vessel, and a fluid outlet port for dispensing said retained fourth fluid;

a second fluid mixing line coupled to said fluid outlet port of said fourth measure module and said fluid outlet port of said third measure;

a volume storage module coupled to said fluid mixing line; and a process supply port coupled to said volume storage module.

* * * * *

UNITED STATES PATENT AND TRADEMARK OFFICE
CERTIFICATE OF CORRECTION

PATENT NO.    : 6,554,162 B2
DATED         : April 29, 2003
INVENTOR(S)   : Schell et al.

It is certified that error appears in the above-identified patent and that said Letters Patent is hereby corrected as shown below:

Column 2,
Line 43, insert the following paragraph:
-- In the particular embodiments shown, the fluids discharged from the measure modules are blended in a fluid mixing line. To facilitate even more uniform mixing, flow controllers are interposed between the fluid output ports of the measure modules and the fluid mixing line, so that the fluids are introduced into the fluid mixing line at a rate proportional to their relative concentration in the mixture. --

Column 16,
Line 28, insert -- module -- after "measure."

Signed and Sealed this

Second Day of September, 2003

JAMES E. ROGAN
*Director of the United States Patent and Trademark Office*